(12) United States Patent
Pang et al.

(10) Patent No.: US 11,466,202 B2
(45) Date of Patent: Oct. 11, 2022

(54) STORABLE LIQUID SUSPENSION OF HOLLOW PARTICLES

(71) Applicant: Halliburton Energy Services, Inc., Houston, TX (US)

(72) Inventors: Xueyu Pang, Tomball, TX (US); Gregory Hundt, Spring, TX (US); Samuel Lewis, Spring, TX (US); Thomas Singh Sodhi, New Caney, TX (US); John P. Singh, Kingwood, TX (US); Brendon Tan, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 518 days.

(21) Appl. No.: 16/336,825

(22) PCT Filed: Nov. 11, 2016

(86) PCT No.: PCT/US2016/061274
§ 371 (c)(1),
(2) Date: Mar. 26, 2019

(87) PCT Pub. No.: WO2018/089004
PCT Pub. Date: May 17, 2018

(65) Prior Publication Data
US 2021/0277303 A1 Sep. 9, 2021

(51) Int. Cl.
*C09K 8/03* (2006.01)
*C09K 8/90* (2006.01)
(Continued)

(52) U.S. Cl.
CPC .............. *C09K 8/905* (2013.01); *C09K 8/032* (2013.01); *C09K 8/035* (2013.01); *C09K 8/467* (2013.01);
(Continued)

(58) Field of Classification Search
CPC ........ C09K 8/905; C09K 8/032; C09K 8/035; C09K 8/467; C09K 8/584; C09K 8/588;
(Continued)

(56) References Cited

U.S. PATENT DOCUMENTS

| 4,370,166 A | 1/1983 | Powers et al. |
| 4,530,402 A | 7/1985 | Smith et al. |

(Continued)

FOREIGN PATENT DOCUMENTS

| CA | 2762605 A1 * | 12/2010 | ............ B82Y 30/00 |
| EP | 1394137 A2 | 3/2004 | |

(Continued)

OTHER PUBLICATIONS

Polymer Composites, Inc., Scotch Lite, retrieved Sep. 22, 2021 from http://www.polymercompositesinc.com/products/specialty/scotch-lite/ (Year: NA).*

(Continued)

*Primary Examiner* — Angela M DiTrani Leff
(74) *Attorney, Agent, or Firm* — McGuire Woods LLP

(57) ABSTRACT

Provided are compositions and methods of using a liquid suspension of hollow particles comprising a plurality of hollow particles, water, a suspending aid, and a stabilizer selected from the group consisting of a non-ionic surfactant, a latex, an oleaginous fluid, porous silica, and combinations thereof. The liquid suspension is homogenous. An example method includes statically storing the liquid suspension in a container for at least one week; wherein the liquid suspension maintains a difference in density from the top of the container to the bottom of the container of less than one pound per gallon while stored. The method further includes adding the liquid suspension to a treatment fluid; wherein the liquid suspension reduces the density of the treatment (Continued)

fluid; and introducing the treatment fluid into a wellbore penetrating a subterranean formation.

10 Claims, 8 Drawing Sheets

(51) Int. Cl.
| | |
|---|---|
| *C09K 8/035* | (2006.01) |
| *C09K 8/467* | (2006.01) |
| *C09K 8/584* | (2006.01) |
| *C09K 8/588* | (2006.01) |
| *C09K 8/60* | (2006.01) |
| *C09K 8/84* | (2006.01) |
| *C09K 8/86* | (2006.01) |
| *C09K 8/88* | (2006.01) |
| *E21B 43/00* | (2006.01) |

(52) U.S. Cl.
CPC .............. *C09K 8/584* (2013.01); *C09K 8/588* (2013.01); *C09K 8/604* (2013.01); *C09K 8/845* (2013.01); *C09K 8/86* (2013.01); *C09K 8/882* (2013.01); *E21B 43/00* (2013.01)

(58) Field of Classification Search
CPC .......... C09K 8/604; C09K 8/845; C09K 8/86; C09K 8/882; E21B 43/00
See application file for complete search history.

(56) References Cited

U.S. PATENT DOCUMENTS

| | | | |
|---|---|---|---|
| 6,814,798 B2* | 11/2004 | Vijn | .................... C04B 20/0084 |
| | | | 106/724 |
| 7,833,344 B2 | 11/2010 | Santra et al. | |
| 10,723,934 B2* | 7/2020 | Lumsden | ................ C09K 8/424 |
| 2003/0177955 A1* | 9/2003 | Vijn | .................... C04B 20/0084 |
| | | | 106/724 |
| 2003/0181542 A1* | 9/2003 | Vijn | ........................ E21B 33/13 |
| | | | 523/130 |
| 2004/0238170 A1 | 12/2004 | Fanguy et al. | |
| 2005/0087341 A1* | 4/2005 | McCabe | .................. C09K 8/64 |
| | | | 166/305.1 |
| 2005/0241545 A1 | 11/2005 | Vargo et al. | |
| 2008/0105428 A1 | 5/2008 | Santra et al. | |
| 2015/0175871 A1* | 6/2015 | Mettath | .................... C09K 8/52 |
| | | | 166/312 |
| 2018/0355236 A1 | 12/2018 | Lumsden et al. | |

FOREIGN PATENT DOCUMENTS

| | | | |
|---|---|---|---|
| WO | 2012061241 A2 | 5/2012 | |
| WO | 2012085516 A2 | 6/2012 | |
| WO | WO-2015147781 A1 * | 10/2015 | ............ C04B 22/004 |

OTHER PUBLICATIONS

Kulakofsky et al., "New Technology for the Delivery of Beaded Lightweight Cements" Society of Petroleum Engineers; Jan. 1, 2005; SPE-94541, 6 pages (see citation cover page for date).
Abdullah et al., "Prehydrating High-strength Microspheres in Lightweight Cement Slurry Creates Value for Offshore Malaysian Operator" Society of Petroleum Engineers; Oct. 22, 2013; SPE-165796, 9 pages.
International Search Report & Written Opinion issued for corresponding International Application No. PCT/US2016/061274 dated Jul. 31, 2017. (12 pages).
Examination Report in AU Application No. 2016428908, dated Apr. 26, 2022.

* cited by examiner

STORABLE LIQUID SUSPENSION OF HOLLOW PARTICLES

TECHNICAL FIELD

The present disclosure relates to the use and production of storable liquid suspensions of hollow particles, and more particularly to producing and storing liquid homogenous suspensions of hollow particles and then introducing the liquid homogenous suspensions to a treatment fluid after storage of the liquid homogenous suspensions.

BACKGROUND

Hollow particles may be used to lower the density of wellbore treatment fluids such as drilling fluids, cement slurries, completion fluids, and the like. Hollow particles may be used to reduce the density of treatment fluids, typically without a substantial effect on other fluid properties, for example, compressive strength of cement slurries after set. Further, the use of hollow particles may preclude the need for water extension or foaming of the treatment fluid. As such, hollow particles are a useful component for producing lightweight treatment fluids having desired densities.

In some instances the hollow particles may be dry blended with other treatment fluid solids for storage and/or transport before hydration and introduction of the treatment fluid in the wellbore. Dry blending the hollow particles with other treatment fluid solids may induce various problems when the treatment fluid is to be prepared and used. For example, the hollow particles are lightweight and may segregate from the heavier treatment fluid solids in the dry blend. If this happens, the dry blend will not be homogenous and may produce a treatment fluid of lesser quality. Moreover, dry blending of the hollow particles before hydration may preclude broad control of treatment fluid density while pumping as the hollow particles have already been added to the dry blend and cannot be removed. Further, the hollow particles may take longer to wet compared to other treatment fluid solids and as such may limit the pump rate of the treatment fluid. Finally, hollow particles may be subject to pneumatic transfer loss. The hollow particles may be one of the more expensive components in the treatment fluid, and any loss may lead to increased operational costs.

In order to resolve the aforementioned issues with dry blending hollow particles, liquid suspensions of hollow particles may be prepared. The liquid suspension of hollow particles may be added to the treatment fluid before the treatment fluid is used. However, it can be difficult to maintain a stable liquid suspension of hollow particles over time. Hollow particles may float to the top of a liquid suspension and ruin homogeneity. Further, the hollow particles may pack together tightly over time, squeezing the water out of the inter-particle space between the hollow particles. The hollow particles may then form a hardened crust at the surface of the liquid suspension. The hardened crust may make resuspension of the hollow particles difficult and time intensive. In larger containers such as those used for field storage, sufficient agitation for resuspension may be impossible without the use of heavy equipment.

BRIEF DESCRIPTION OF THE DRAWINGS

Illustrative examples of the present disclosure are described in detail below with reference to the attached drawing figures, which are incorporated by reference herein, and wherein.

Figure 1:
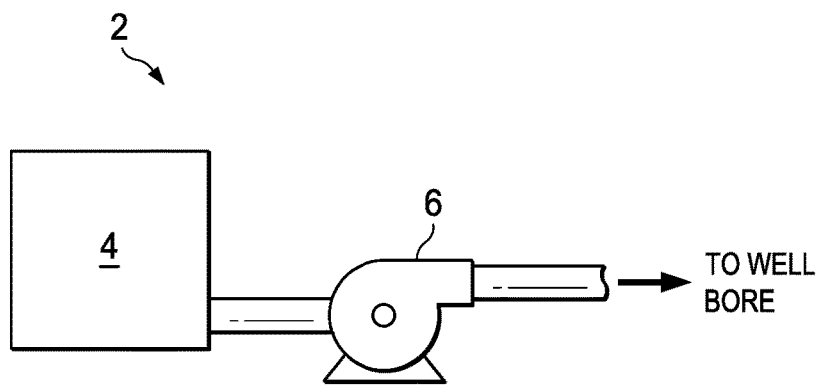
FIG. 1 illustrates a schematic of a system for the preparation and delivery of a treatment fluid to a wellbore in accordance with the disclosed examples.

The illustrated figures are only exemplary and are not intended to assert or imply any limitation with regard to the environment, architecture, design, or process in which different examples may be implemented.

DETAILED DESCRIPTION

The present disclosure relates to the use and production of storable liquid suspensions of hollow particles, and more particularly to producing and storing liquid homogenous suspensions of hollow particles and then introducing the liquid homogenous suspensions to a treatment fluid after storage of the liquid homogenous suspensions.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the compositions and methods described herein comprise the production and use of a storable liquid suspension of hollow particles. The storable liquid suspension comprises an aqueous fluid, hollow particles, a suspending aid, and a stabilizer. As used herein, "storable" and all variations thereof refers to the static storage of the liquid suspension in a homogenous state. As used herein, "static" means without agitation such as stirring or mixing of the liquid suspension while stored in the container, but does not include moving the container, for example, to transport it; or removing the liquid suspension from the container, for example, by pouring or draining the container. As used herein, "homogenous" refers to a suspension having a range of density from the top of the container to the bottom of the container of less than one pound per gallon (hereafter "ppg"). In some examples, the liquid suspension may be stored for four months or longer. When desired for use, the liquid suspension may be added to a treatment fluid to adjust the density of the treatment fluid. The treatment fluid may then be introduced into a wellbore to perform a wellbore operation.

Examples of the liquid suspensions described herein comprise hollow particles. As used herein, the term "hollow particles" refers to hollow, rigid, substantially spherical particles having a specific gravity of less than 1. As used herein, the term "substantially spherical" refers to a generally spherical shape that may include defects like indentations, protrusions, holes, and the like. General examples of hollow particles include, but are not limited to, hollow glass beads, hollow ceramic beads, and a combination thereof. Specific examples of hollow particles may include, but are not limited to, glass spheres, glass microspheres, ceramic spheres, cenospheres, or combinations thereof. The hollow particles may comprise materials including, but not limited to, glass, soda lime, borosilicates, fly ash, ceramic, or combinations thereof. With the benefit of this disclosure one of ordinary skill in the art will be able to select a hollow bead for a given application.

In some examples, the hollow particles may have an average particle size distribution (D50) in the range of about 5 μm to about 110 μm. In some examples, the hollow particles may have an average particle size distribution (D10) in the range of about 5 μm to about 20 μm. In some examples, the hollow particles may have an average particle size distribution (D90) in the range of about 40 μm to about 75 μm. The average particle size of the hollow particles may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the average particle size distribution (D50) of the hollow particles may be about 5 μm, about 10 μm, about 20 μm, about 30 μm, about 40 μm, about 50 μm, about 60 μm, about 70 μm, about 80 μm, about 90 μm, about 100 μm, or about 110 μm. However, particle sizes outside these defined ranges also may be suitable for particular applications. Particle sizes may be measured using various methods, including using a laser light scattering particle size analyzer. With the benefit of this disclosure, one of ordinary skill in the art will be able to select a particle size for the hollow particles for a given application.

In some examples, the concentration of the hollow particles in the liquid suspension may be in the range of about 25% to about 75% by volume of the liquid suspension. The concentration of the hollow particles may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the hollow particles in the liquid suspension may be about 25%, about 30%, about 35%, about 40%, about 45%, about 50%, about 55%, about 60%, about 65%, about 70%, or about 75% by volume of the liquid suspension. However, concentrations outside these defined ranges also may be suitable for particular applications. With the benefit of this disclosure, one of ordinary skill in the art will be able to select a concentration of hollow particles for a given application.

The liquid suspension may comprise an aqueous fluid. The aqueous fluid may generally be from any source including the subterranean formation. In various examples, the aqueous fluid may comprise fresh water, acidified water, salt water, seawater, brine, or an aqueous salt solution. In some embodiments, the aqueous fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like.

The liquid suspension may comprise a suspending aid. General examples of suspending aids include, but are not limited to, polymers and clays. Specific examples of polymers include, but are not limited to, diutan gums, scleroglucan, guar gums, carragenans, xanthan gums, welan, celluloses, hydroxyethyl celluloses, and combinations thereof. Specific examples of clays include bentonite, attapulgite, sepiolite, vermiculite, illite, muscovite, biotite, kaolinite, cookeite, halloysite, flint clay, montmorillonite, hectorite, laponite and combinations thereof. In a preferred specific example, the suspending aid comprises diutan gum. With the benefit of this disclosure, one of ordinary skill in the art will be able to select a suspending aid for a given application.

In some examples, the concentration of the suspending aid in the liquid suspension may be in the range of about 0.1% to about 30% by volume of the liquid suspension. The concentration of the suspending aid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the suspending aid in the liquid suspension may be about 0.1%, about 0.5%, about 1%, about 5%, about 10%, about 15%, about 20%, about 25%, or about 30% by volume of the liquid suspension. However, concentrations outside these defined ranges also may be suitable for particular applications. With the benefit of this disclosure, one of ordinary skill in the art will be able to select a concentration of the suspending aid for a given application.

The liquid suspension may comprise a stabilizer. Generally, the stabilizers may be divided into two categories, non-ionic surfactants and particle-packing stabilizers. Examples of non-ionic surfactants include, but are not limited to, polyethylene oxide, polypropylene oxide, polyethyleneglycol alkyl ethers, polypropylene alkyl ethers, glucoside alkyl ethers, polyethyleneglycol alkylphenyl ethers, glycerol alkyl esters, sorbitan alkyl esters, polyethylene glycol/polypropylene glycol block copolymers, the like, derivatives thereof, or mixtures thereof.

In some examples, the concentration of the non-ionic surfactant in the liquid suspension may be in the range of about 0.1% to about 30% by weight of the liquid suspension. The concentration of the non-ionic surfactant may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the non-ionic surfactant in the liquid suspension may be about 0.1%, about 0.5%, about 1%, about 5%, about 10%, about 15%, about 20%, about 25%, or about 30% by weight of the liquid suspension. However, concentrations outside these defined ranges also may be suitable for particular applications. With the benefit of this disclosure, one of ordinary skill in the art will be able to select a concentration of the non-ionic surfactant for a given application.

Particle-packing stabilizers must be water-insoluble. The particle-packing stabilizers may be provided to the liquid suspension as a suspension of particles, an emulsion of particles, or as particulate matter to be dispersed in the liquid suspension. The average particle size of the particles in the particle-packing stabilizer is in the range of about 100 nm to about 10 microns. The average particle size of the particles in the particle-packing stabilizer may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the average particle size of the particles in the particle-packing stabilizer may be about 100 nm, about 250 nm, about 500 nm, about 750 nm, about 1 micron, about 2.5 microns, about 5 microns, about 7.5 microns, or about 10 microns. However, particle sizes outside these defined ranges also may be suitable for particular applications. Particle sizes may be measured by various methods including using a laser light scattering particle size analyzer. With the benefit of this disclosure, one of ordinary skill in the art will be able to select a particle size for the hollow particles for a given application.

Without limitation by theory, particle-packing stabilizers may be used to separate the hollow bead particles and prevent or reduce the close packing of hollow bead particles by insertion of the particle-packing stabilizer into the interparticle spaces between the hollow bead particles such that sufficient separation between the hollow bead particles is maintained. Examples of particle-packing stabilizers include latex, oleaginous fluids, particulate porous silica, or combinations thereof.

As discussed above, an example of a particle-packing stabilizer is latex. Latex is the stable dispersion of rubber microparticles in an aqueous medium and may be natural or synthetic. As will be understood by those of ordinary skill in the art, the latex may comprise any of a variety of rubber materials available in latex form. For example, natural rubber (cis-1,4-polyisoprene) in most of its modified types can be utilized. Synthetic polymers of various types can also be used including styrene-butadiene rubber, cis-1,4-polybutadiene rubber, high styrene resin, butyl rubber, ethylene-propylene rubbers, neoprene rubber, nitrile rubber, cis-/trans-1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber, polysulfide rubber, blends thereof, derivatives thereof, or combinations thereof. The rubber materials may be commercially available in latex form, i.e., aqueous dispersions or emulsions which are utilized directly.

In some examples, the concentration of the latex in the liquid suspension may be in the range of about 0.1% to about 75% by volume of the liquid suspension. The concentration of the latex may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the latex in the liquid suspension may be about 0.1%, about 0.5%, about 1%, about 5%, about 10%, about 15%, about 20%, about 25%, or about 30% by volume of the liquid suspension. However, concentrations outside these defined ranges also may be suitable for particular applications. With the benefit of this disclosure, one of ordinary skill in the art will be able to select a type and concentration of latex for a given application.

As discussed above, an example of a particle-packing stabilizer is an oleaginous fluid. General examples of oleaginous fluids include, but are not limited to, petroleum oils, natural oils, synthetically-derived oils, or combinations thereof. More particularly, specific examples of oleaginous fluids include, but are not limited to, diesel oil, kerosene oil, mineral oil, synthetic oil, such as polyolefins (e.g., alpha-olefins and/or internal olefins), polydiorganosiloxanes, esters, diesters of carbonic acid, paraffins, or combinations thereof.

In some examples, the concentration of the oleaginous fluid in the liquid suspension may be in the range of about 0.1% to about 30% by volume of the liquid suspension. The concentration of the oleaginous fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the oleaginous fluid in the liquid suspension may be about 0.1%, about 0.5%, about 1%, about 5%, about 10%, about 15%, about 20%, about 25%, or about 30% by volume of the liquid suspension. However, concentrations outside these defined ranges also may be suitable for particular applications. With the benefit of this disclosure, one of ordinary skill in the art will be able to select a type and concentration of oleaginous fluid for a given application.

As discussed above, an example of a particle-packing stabilizer is a particulate porous silica. Particulate porous silica may be obtained commercially or prepared by precipitation. For example, sulfuric acid and a sodium silicate solution may be added to water in a reaction vessel with high agitation. The mixture of acid, sodium silicate and water must be mixed at a high rate to prevent the formation of low pH areas where gelation may occur. Since silica dissolves to form silicate at a pH value above about 9, smaller particles are continuously dissolved during the precipitation process and therefore, uniform particle sizes are obtained. As the silica precipitation progresses, the small particles aggregate through siloxane bridges to form three dimensional networks that resist the high capillary pressure that develops during drying. After drying, the precipitated particulate silica is porous and remains dry and free flowing after absorbing liquids.

In some examples, the concentration of the particulate porous silica in the liquid suspension may be in the range of about 0.1% to about 30% by volume of the liquid suspension. The concentration of the particulate porous silica may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the particulate porous silica in the liquid suspension may be about 0.1%, about 0.5%, about 1%, about 5%, about 10%, about 15%, about 20%, about 25%, or about 30% by volume of the liquid suspension. However, concentrations outside these defined ranges also may be suitable for particular applications. With the benefit of this disclosure, one of ordinary skill in the art will be able to prepare or obtain particulate porous silica and also select a concentration of particulate porous silica for a given application.

In some optional examples, a defoaming agent may be added to the liquid suspension. Where present, the defoaming agent should act to prevent foaming during mixing of the liquid supsension. Examples of the defoaming agent include, but are not limited to, polyols, silicon defoamers, alkyl polyacrylates, ethylene oxide/propylene oxide compounds, acetylenic diols, and any combination thereof.

In the optional examples comprising a defoaming agent, the concentration of the defoaming agent in the liquid suspension may be in the range of about 0.1% to about 10% by volume of the liquid suspension. The concentration of the defoaming agent may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the defoaming agent in the liquid suspension may be about 0.1%, about 0.5%, about 1%, about 2%, about 3%, about 4%, about 5%, about 7%, or about 10% by volume of the liquid suspension. However, concentrations outside these defined ranges also may be suitable for particular applications. With the benefit of this disclosure, one of ordinary skill in the art will be able to select a concentration of defoaming agent for a given application.

In some optional examples, a dispersant may be added to the liquid suspension. Where present, the dispersant should act to assist in controlling the rheology of the liquid suspension. Examples of the dispersant include, but are not limited to, naphthalene sulfonic acid condensate with formaldehyde; acetone, formaldehyde, and sulfite condensate; melamine sulfonate condensed with formaldehyde; or any combination thereof.

In the optional examples comprising a dispersant, the concentration of the dispersant in the liquid suspension may be in the range of about 0.1% to about 5% by volume of the liquid suspension. The concentration of the dispersant may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the dispersant in the liquid suspension may be about 0.1%, about 0.5%, about 1%, about 2%, about 3%, about 4%, or about 5% by volume of the liquid suspension. However, concentrations outside these defined ranges also may be suitable for particular applications. With the benefit of this disclosure, one of ordinary skill in the art will be able to select a concentration of dispersant for a given application.

Generally, the examples of the liquid suspension should have a density suitable for a particular application. By way of example, the liquid suspension may have a density of about 5 ppg to about 10 ppg. The density of the liquid suspension may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the density of the liquid suspension may be about 5 ppg, about 6 ppg, about 7 ppg, about 8 ppg, or about 10 ppg. However, concentrations outside these defined ranges also may be suitable for particular applications. Those of ordinary skill in the art, with the benefit of this disclosure, will recognize the appropriate density for a particular application.

As previously mentioned, the liquid suspension may be stored until desired for use. In some examples, the liquid suspension is stored in a static state and remains homogenous while stored. The storable liquid suspension is characterized in that it may be statically stored in a homogenous, flowable fluid state for a time of four months or longer at room temperature. For example, the liquid suspension may be statically stored in a homogenous, flowable fluid state for a period of time from about 1 week, about 2 weeks, about 3 weeks, about 4 weeks, about 2 months, about 3 months, about 4 months, or longer. A fluid is considered to be in a flowable fluid state where the fluid has a viscosity of less than 2000 cP.

When desired for use, the liquid suspension may be added to a treatment fluid to adjust the density of the treatment fluid. The treatment fluid may be introduced into a wellbore to perform a wellbore operation. The liquid suspension may be added to a variety of treatment fluids used in wellbore operations. Examples of treatment fluids include, but are not limited to, water-based drilling fluids, cement slurries, completion fluids, displacement fluids, conformance fluids, and the like. The concentration of the liquid suspension in the treatment fluid is dependent upon the amount of liquid suspension required to produce a desired change in density of the treatment fluid.

Referring now to FIG. 1, preparation of a treatment fluid comprising the liquid suspension of hollow particles in accordance with the examples disclosed herein will now be described. FIG. 1 illustrates a system 2 for preparation of a treatment fluid comprising the liquid suspension of hollow particles. The liquid suspension of hollow particles may be added to a treatment fluid and mixed in mixing equipment 4. Mixing equipment 4 may be any mixer sufficient for mixing the liquid suspension of hollow particles with the treatment fluid or the components of the treatment fluid in order to provide a treatment fluid with the desired density. Examples of mixing equipment 4 may include, but are not limited to, a jet mixer, re-circulating mixer, a batch mixer, and the like. In some examples, mixing equipment 4 may be a jet mixer and may continuously mix the treatment fluid as it is pumped to the wellbore. The liquid suspension of hollow particles may be added to mixing equipment 4 first or, alternatively, the treatment fluid may be added to mixing equipment 4 first. In some examples, the treatment fluid may be formulated in mixing equipment 4 such that the components of the treatment fluid, including the liquid suspension of hollow particles, may be added to the mixing equipment 4 in any order and mixed to provide the desired treatment fluid. A sufficient amount of the liquid suspension of hollow particles should be added to mixing equipment 4 to provide a treatment fluid with the desired density. In examples, the liquid suspension of hollow particles may be added directly to mixing equipment 4 without agitation. The liquid suspension of hollow particles may be added to mixing equipment 4 by flowing the liquid suspension of hollow particles out of its storage container. In alternative examples, the liquid suspension may be agitated prior to flowing the liquid suspension into mixing equipment 4.

After the liquid suspension of hollow particles has been added to the treatment fluid and mixed in mixing equipment 4 to provide a treatment fluid with a desired density, the treatment fluid may be pumped to the wellbore via pumping equipment 6. In some examples, the mixing equipment 4 and the pumping equipment 6 may be disposed on one or more cement trucks as will be apparent to those of ordinary skill in the art. Examples of pumping equipment 6 include, but are not limited to, floating piston pumps, positive displacement pumps, centrifugal pumps, peristaltic pumps, and diaphragm pumps.

Figure 2A:
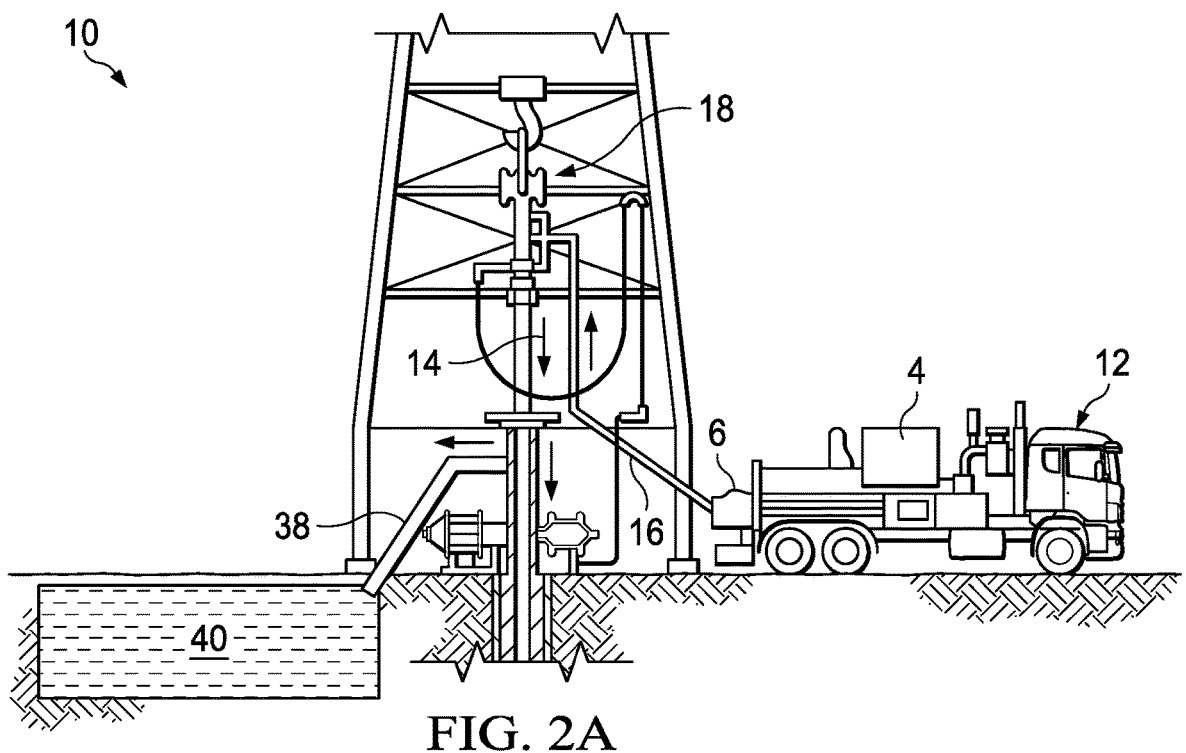
FIG. 2A illustrates a schematic of a system of surface equipment that may be used in the placement of a treatment fluid in a wellbore in accordance with the disclosed examples.
Figure 2B:
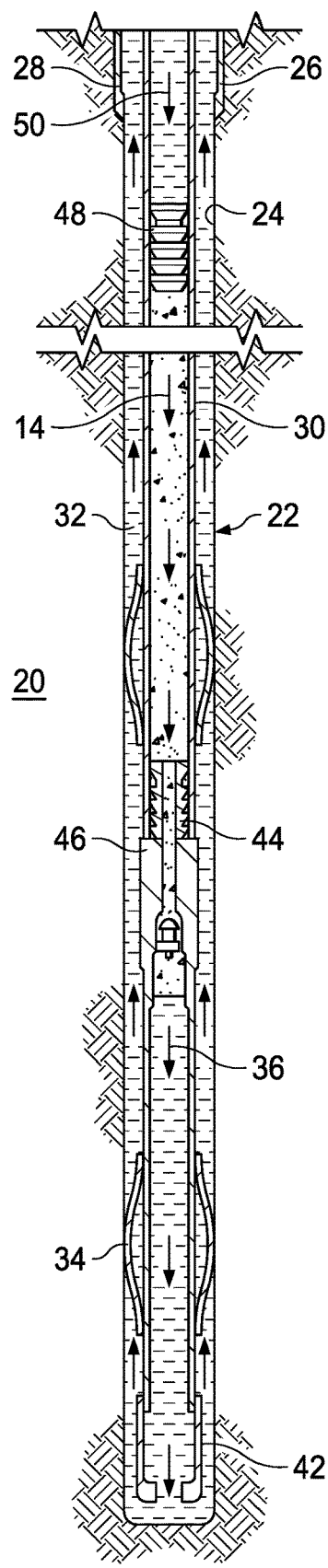
FIG. 2B illustrates a schematic of a system used for the placement of a treatment fluid into a wellbore annulus in accordance with the disclosed examples.

With reference to FIGS. 2A and 2B, an example technique for placing a treatment fluid comprising the liquid suspension of hollow particles is described. Specifically, the placement of a cement composition of a specific desired density is described. FIG. 2A illustrates surface equipment 10 that may be used in placement of a cement composition in accordance with certain examples disclosed herein. It should be noted that while FIG. 2A generally depicts a land-based operation, those skilled in the art will readily recognize that the principles described herein are equally applicable to subsea operations that employ floating or sea-based platforms and rigs without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 as will be apparent to those of ordinary skill in the art. The cementing unit 12 may pump a cement composition 14 through feed pipe 16 and to a cementing head 18, which conveys the cement composition 14 downhole into a wellbore.

Turning now to FIG. 2B, the cement composition 14 may be placed into a subterranean formation 20 in accordance with certain examples. As illustrated, a wellbore 22 may be drilled into the subterranean formation 20. While wellbore 22 is shown extending vertically into the subterranean formation 20, the principles described herein are also applicable to wellbores that extend at an angle through the subterranean formation 20, such as horizontal and slanted wellbores. As illustrated, the wellbore 22 comprises walls 24. A surface casing 26 has been inserted into the wellbore 22. The surface casing 26 may be cemented to the walls 24 of the wellbore 22 by cement sheath 28. In the illustrated embodiment, casing 30 is disposed in the wellbore 22. In some examples, one or more additional conduits (e.g., intermediate casing, production casing, liners, tubing, coiled tubing, jointed tubing, stick pipe, etc.) may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. In some examples, these displaced other fluids 36 may also be treatment fluids comprising the disclosed liquid suspension of hollow particles. At least a portion of the displaced other fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the other fluids 36 that may be inside the casing 30 prior to cementing. After the bottom plug 44 reaches a landing collar 46, a diaphragm, or other suitable device may rupture to allow the cement composition 14 through the bottom plug 44. In FIG. 2B, the bottom plug 44 is illustrated as positioned on the landing collar 46. In the illustrated example, a top plug 48 may be introduced into the wellbore 22 behind the cement composition 14. The top plug 48 may separate the cement composition 14 from a displacement fluid 50 and also push the cement composition 14 through the bottom plug 44. When positioned as desired, the cement composition 14 may then be allowed to set. In some examples, the displacement fluid 50 may comprise the disclosed liquid suspension of hollow particles to provide the displacement fluid 50 with a desired density.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-2B.

EXAMPLES

The present disclosure can be better understood by reference to the following examples which are offered by way of illustration. The present disclosure is not limited to the examples given herein.

Example 1

Five different formulations of liquid suspensions comprising hollow particles were prepared. All five formulations comprised hollow glass beads with a D50 particle size of 26 μm. Formulation 1 was a control and consisted of only the glass beads and water. Formulation 2 consisted of the glass beads, water, and bentonite as a particle-packing stabilizer. Soda ash was used to exfoliate the bentonite. Formulation 3 was the same as Formulation 2 except a poloxamer nonionic surfactant was added as an additional stabilizer. Additionally, a defoaming agent was added to Formulation 3. Formulations 4 and 5 used the same non-ionic surfactant stabilizer and defoaming agent as Formulation 3; however, Formulations 4 and 5 used different concentrations of diutan gum as the particle-packing stabilizer instead of bentonite.

Rheological parameters were derived by fitting the generalized Herschel-Bulkley model (hereafter "GHB") to test data obtained from a FANN® 35 viscometer with a FANN® yield stress adapter. FANN is a registered trademark of Halliburton Energy Services of Houston, Tex. The GHB model was applied to the down ramp of the rheogram, i.e. after the samples had experienced a shear history. Gel time was determined as the time it takes for the liquid suspensions of hollow particles to form a soft gel and stop flowing when the container was tilted. A visual check was performed in the lab by intermittently tilting the container to check the flow of the samples. The formula compositions and rheological data are illustrated in Table 1 below.

TABLE 1

Volume compositions of Formulations 1-5 and corresponding gel times and rheological data

|  | Formulation 1 | Formulation 2 | Formulation 3 | Formulation 4 | Formulation 5 |
|---|---|---|---|---|---|
| Composition | 1 | 2 | 3 | 4 | 5 |
| Glass Beads | 55.5 | 55.5 | 55.5 | 55.5 | 55.5 |
| Non-Ionic Surfactant Stabilizer | — | — | 0.2 | 0.2 | 0.2 |
| Defoamer | — | — | 0.75 | 0.75 | 0.75 |
| Water | 44.5 | 44.25 | 43.3 | 43.51 | 43.5 |
| Soda Ash | — | 0.07 | 0.07 | — | — |
| Clay Suspending Aid | — | 0.18 | 0.18 | — | — |
| Polymer Suspending Aid | — | — | — | 0.04 | 0.05 |
| Yield Point, lbf/100 ft$^2$ | 11.0 | 5.6 | — | 26.9 | 36 |
| Viscosity, cP | 145.8 | 154.6 | — | 560.2 | 960.5 |
| Gel Time 70° F. | 1 hrs. | 6 hrs. | 1 day | 3 wks. | 3 wks. |
| Gel Time 120° F. | — | 0.5 hrs. | 1 hrs. | 3 days | 3 days |

Example 2

Four new formulations of liquid suspensions comprising hollow particles were prepared that all used the composition of Formulation 4 as a base, but additionally comprised latex.

The formula compositions and rheological data are illustrated in Table 2 below.

TABLE 2

Volume compositions of Formulations 6-9 and corresponding gel times and rheological data

| Composition | Formulation 4 | Formulation 6 | Formulation 7 | Formulation 8 | Formulation 9 |
|---|---|---|---|---|---|
| Glass Beads | 55.5 | 55.5 | 55.5 | 55.5 | 55.5 |
| Non-Ionic Surfactant Stabilizer | 0.2 | 0.2 | 0.2 | 0.2 | 0.2 |
| Defoamer | 0.75 | 0.75 | 0.75 | 0.75 | 0.75 |
| Water | 43.51 | 38.51 | 33.51 | 28.51 | 23.51 |
| Latex Stabilizer | 0 | 5 | 10 | 15 | 20 |
| Polymer Suspending Aid | 0.04 | 0.04 | 0.04 | 0.04 | 0.04 |
| Yield Point, lbf/100 ft$^2$ | 26.9 | 13.6 | 10.4 | 12.7 | 12.6 |
| Viscosity, cP | 560.2 | 503.4 | 598.2 | 649.4 | 891.0 |
| Gel Time 70° F. | 3 wks. | 1 mos. | 1.5 mos. | 1.5 mos. | 3 mos. |
| Gel Time 120° F. | 3 days | 9 days | 10 days | 10 days | 19 days |

Figure 3A:
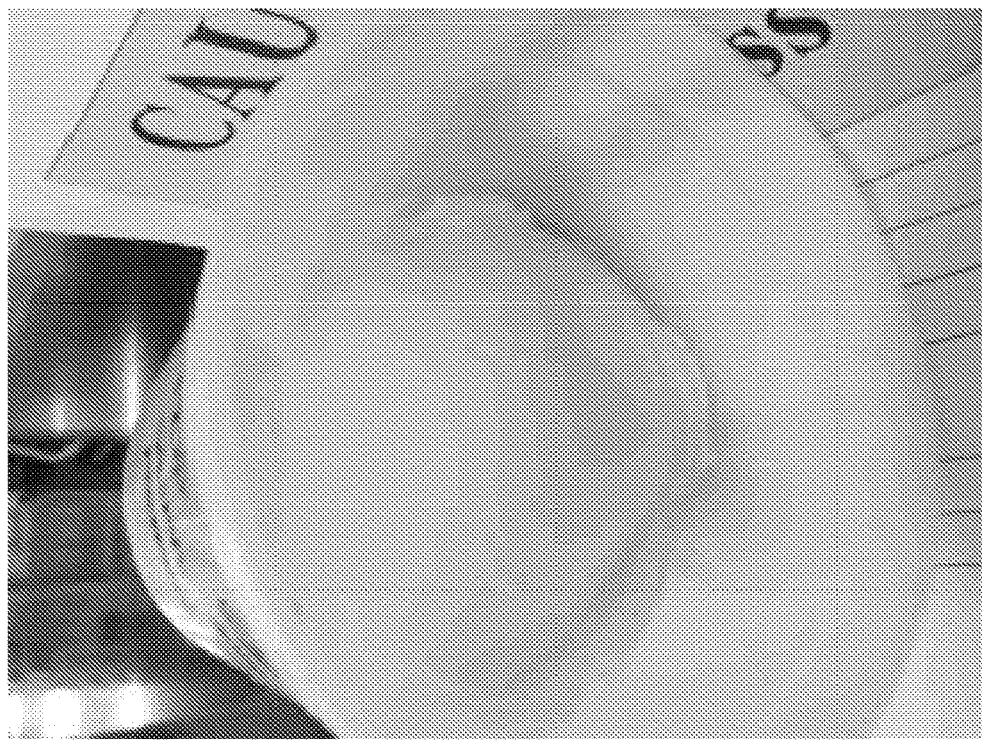
FIG. 3A illustrates a comparison photo of a specific formulation of a liquid suspension of hollow particles after aging 1 month in accordance with the disclosed examples.
Figure 3B:
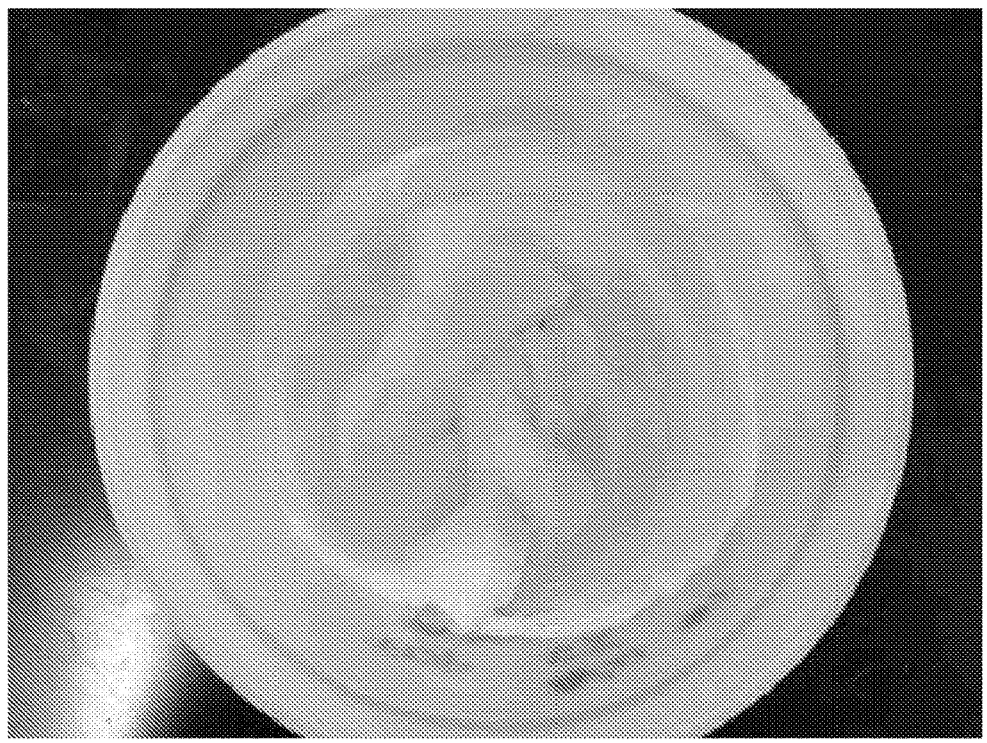
FIG. 3B illustrates a comparison photo of the specific formulation illustrated in FIG. 3A after aging 2 months in accordance with the disclosed examples.
Figure 4A:
FIG. 4A illustrates a comparison photo of another specific formulation of a liquid suspension of hollow particles after aging 1 month in accordance with the disclosed examples.
Figure 4B:
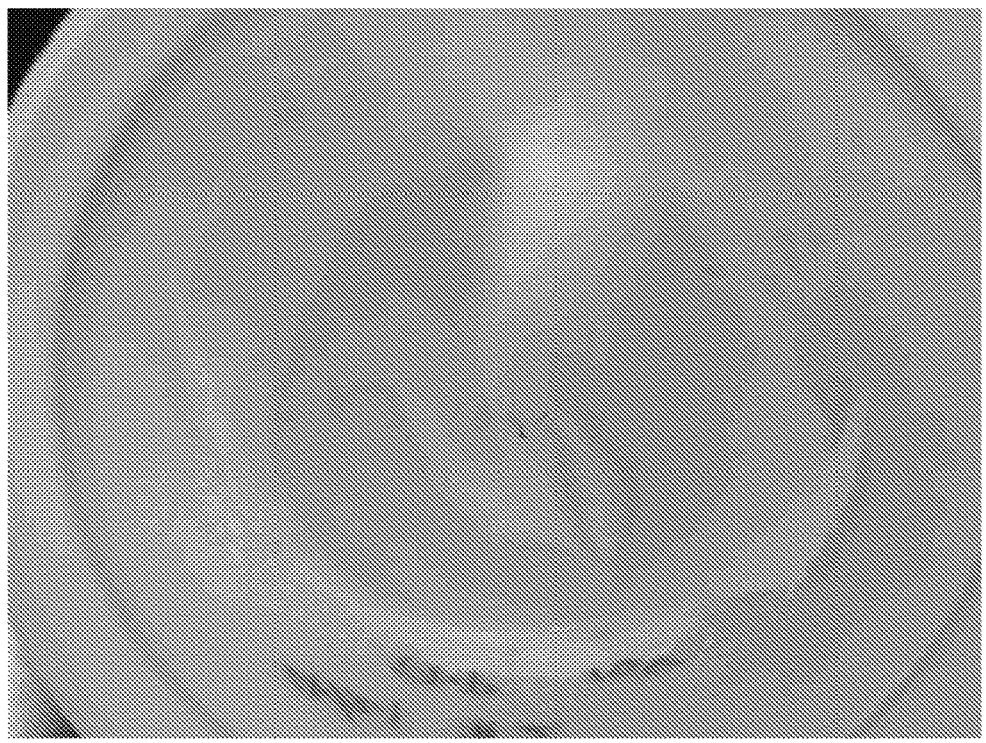
FIG. 4B illustrates a comparison photo of the specific formulation illustrated in FIG. 4A after aging 2 months in accordance with the disclosed examples.
Figure 5A:
FIG. 5A illustrates a comparison photo of another specific formulation of a liquid suspension of hollow particles after aging 1 month in accordance with the disclosed examples.
Figure 5B:
FIG. 5B illustrates a comparison photo of the specific formulation illustrated in FIG. 5A after aging 2 months in accordance with the disclosed examples.
Figure 6A:
FIG. 6A illustrates a comparison photo of another specific formulation of a liquid suspension of hollow particles after aging 1 month in accordance with the disclosed examples.
Figure 6B:
FIG. 6B illustrates a comparison photo of the specific formulation illustrated in FIG. 6A after aging 2 months in accordance with the disclosed examples.
Figure 7:
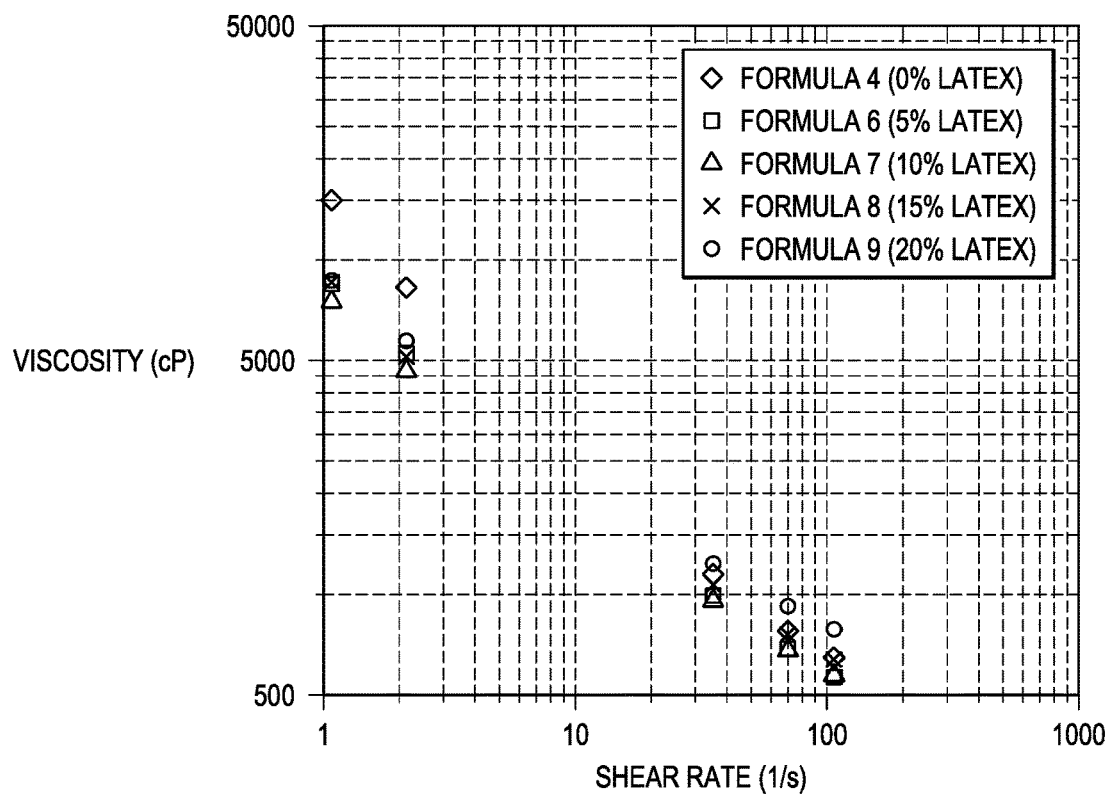
FIG. 7 is a graph of rheology test results of different formulations of liquid suspensions of hollow particles in accordance with the disclosed examples.

FIG. 3A illustrates a comparison photo of Formulation 6 after aging 1 month, and FIG. 3B illustrates a comparison photo of Formulation 6 after aging 2 months. FIG. 4A illustrates a comparison photo of Formulation 7 after aging 1 month, and FIG. 4B illustrates a comparison photo of Formulation 7 after aging 2 months. FIG. 5A illustrates a comparison photo of Formulation 8 after aging 1 month, and FIG. 5B illustrates a comparison photo of Formulation 8 after aging 2 months. FIG. 6A illustrates a comparison photo of Formulation 9 after aging 1 month, and FIG. 6B illustrates a comparison photo of Formulation 9 after aging 2 months. As illustrated, Formulation 9 was still flowable at 3 months. FIG. 7 is a graph of the rheology test results of the different liquid suspension compositions for Formulations 4 and 6-9.

Example 3

A new formulation was prepared that was similar to Formulation 6 but used half as much of the non-ionic stabilizer. This sample was tested over different periods of time using the methods described above as well as a new method of rheological testing using a Marsh funnel. At 2.5 weeks the sample was remixed and a friction reducer was added at a concentration of 0.3% by volume.

The formula composition and rheological data is illustrated in Table 3 below.

TABLE 3

Volume compositions of Formulation 10 and corresponding rheological data

| Composition | Formulation 10 |
|---|---|
| Glass Beads | 55.5 |
| Non-Ionic Surfactant Stabilizer | 0.1 |
| Defoamer | 0.75 |
| Water | 38.21 |
| Latex Stabilizer | 5 |
| Polymer Suspending Aid | 0.04 |
| Friction Reducer (added when the sample was aged 2.5 wks) | 0.3 |

| | | Age | 0 | 12 days | 2.5 wks (remixed only) | 2.5 wks. w/ Friction Reducer and remixed | 5.5 Wks. | 9.5 Wks. |
|---|---|---|---|---|---|---|---|---|
| Fann 35 Viscometer | Yield Point, lbf/100 ft² | | 14.1 | 32.7 | 27.5 | 16.2 | 17.6 | 15.9 |
| | Viscosity, cP | | 487.2 | 485.4 | 637.3 | 469.4 | 486.2 | 525.5 |
| Marsh Funnel | Funnel Time, hh:mm:ss | | 00:21:33 | — | 01:03:00 | 00:24:30 | — | — |
| | Viscosity, cP | | 854.6 | — | 2531.9 | 973.9 | — | — |

Figure 8:
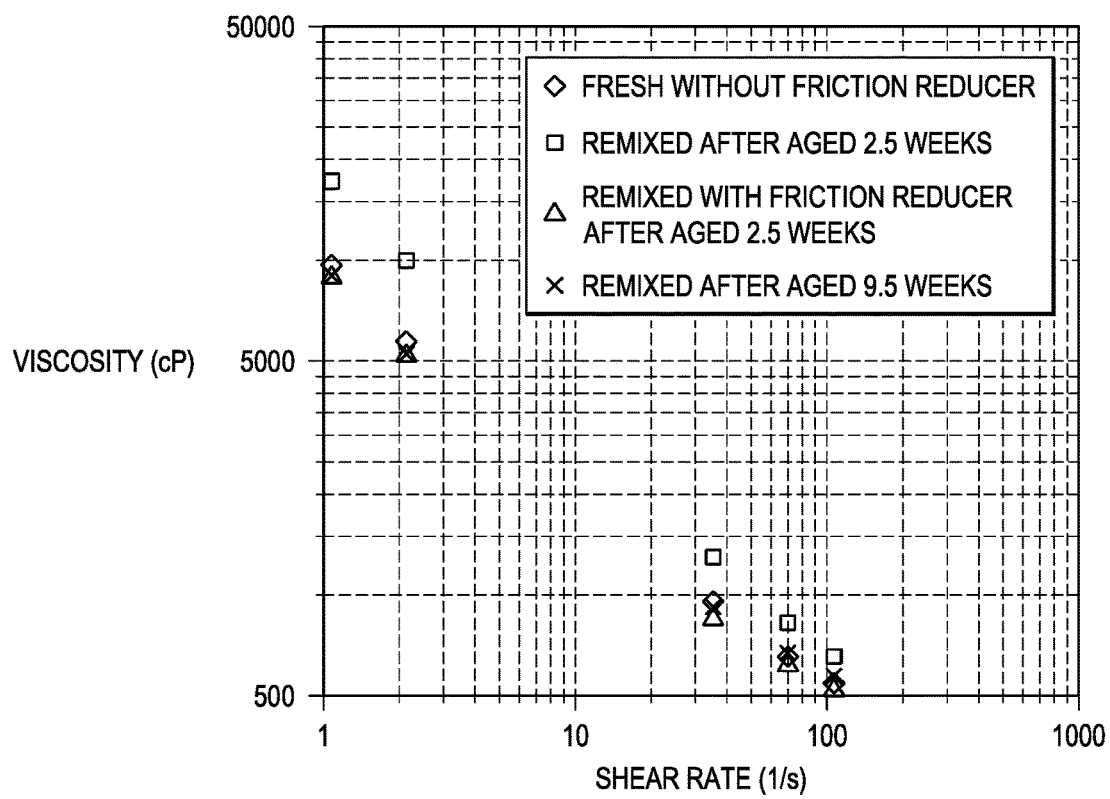
FIG. 8 is a graph of rheology test results of a formulation of a liquid suspension of hollow particles in accordance with the disclosed examples.

FIG. 8 is a graph of the rheology test results for Formulation 10 for different time periods.

Example 4

A Formulation 11 was prepared which used a higher concentration of non-ionic surfactant and also comprised a friction reducer. The Formulation 11 composition is illustrated in Table 4 below.

TABLE 4

Volume compositions of Formulation 11

| Composition | Formulation 11 |
|---|---|
| Glass Beads | 55.5 |
| Non-Ionic Surfactant Stabilizer | 0.3 |
| Defoamer | 0.75 |
| Water | 33.11 |
| Latex Stabilizer | 10 |
| Polymer Suspending Aid | 0.04 |
| Friction Reducer | 0.3 |

Figure 9:
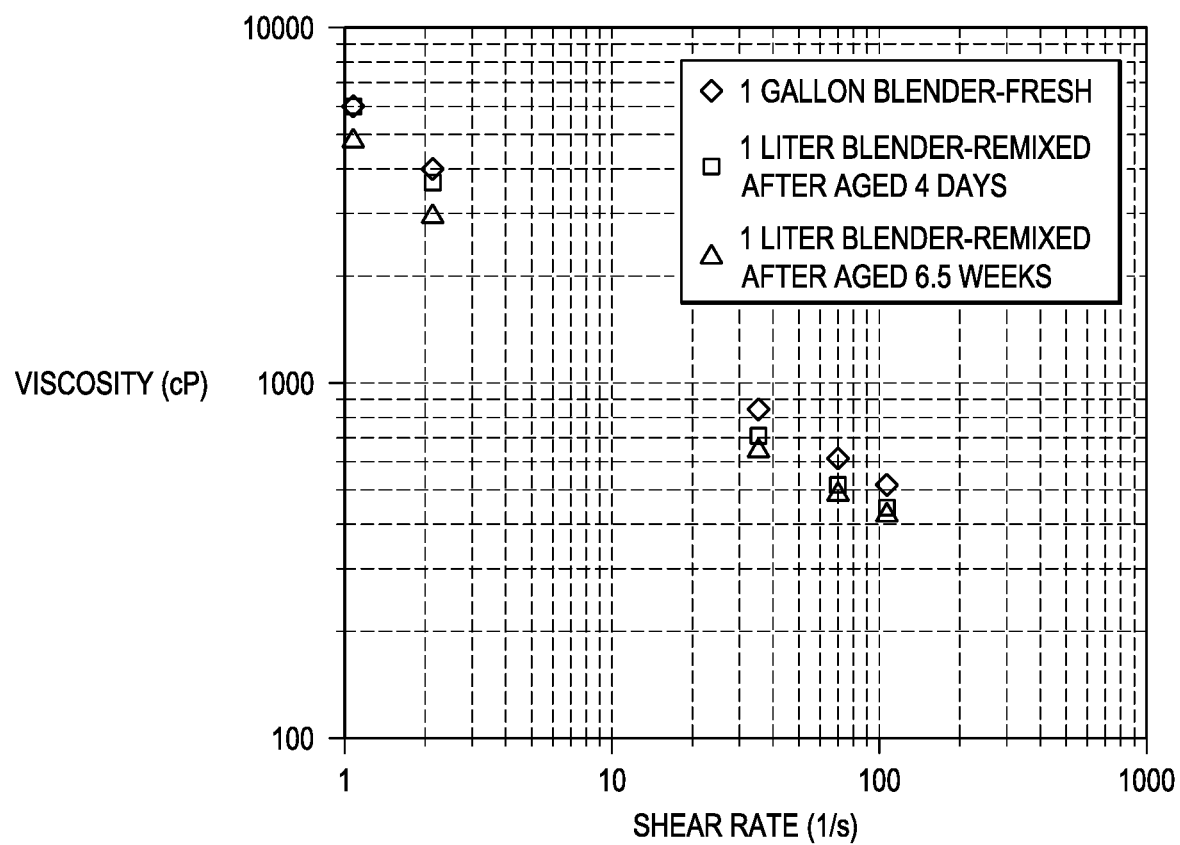
FIG. 9 is a graph of rheology test results of another formulation of a liquid suspension of hollow particles in accordance with the disclosed examples.

FIG. 9 is a graph of the rheology test results for Formulation 11 for different time periods.

Provided are compositions for a storable liquid suspension of hollow particles in accordance with the description provided herein. An example composition comprises a plurality of hollow particles, water, a suspending aid, and a stabilizer selected from the group consisting of a non-ionic surfactant, a latex, an oleaginous fluid, porous silica, and combinations thereof; wherein the liquid suspension is homogenous. The plurality of hollow particles may be selected from the group consisting of glass spheres, glass microspheres, ceramic spheres, cenospheres, and combinations thereof. The plurality of hollow particles may comprise materials selected from the group consisting of glass, soda lime, borosilicates, fly ash, ceramic, and combinations thereof, The average particle size (D50) of the plurality of hollow particles may be in a range from about 5 μm to about 110 μm. The concentration of the plurality of hollow particles in the liquid suspension may range from about 25% to about 75% by volume of the liquid suspension. The suspending aid may be selected from the group consisting of diutan gums, scleroglucan, guar gums, carragenans, xanthan gums, welan, celluloses, hydroxyethyl celluloses, bentonite, attapulgite, sepiolite, vermiculite, illite, muscovite, biotite, kaolinite, cookeite, halloysite, flint clay, montmorillonite, hectorite, and combinations thereof. The stabilizer may comprise the non-ionic surfactant and the non-ionic surfactant may be selected from the group consisting of polyethylene oxide, polypropylene oxide, polyethyleneglycol alkyl ethers, polypropylene alkyl ethers, glucoside alkyl ethers, polyethyleneglycol alkylphenyl ethers, glycerol alkyl esters, sorbitan alkyl esters, polyethylene glycol/polypropylene glycol block copolymers, derivatives thereof, and mixtures thereof. The stabilizer may comprise the latex and the latex may comprise a rubber selected from the group consisting of cis-1,4-polyisoprene rubber, styrene-butadiene rubber, cis-1,4-polybutadiene rubber, high styrene resin, butyl rubber, ethylene-propylene rubbers, neoprene rubber, nitrile rubber, cis-/trans-1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber, polysulfide rubber, blends thereof, derivatives thereof, and combinations thereof. The stabilizer may comprise the oleaginous fluid and the oleaginous fluid may be selected from the group consisting of petroleum oils, natural oils, synthetically-derived oils, diesel oil, kerosene oil, mineral oil, synthetic oil, polyolefins, polydiorganosiloxanes, esters, diesters of carbonic acid, paraffins, and combinations thereof. The composition may further comprise a defoaming agent, a dispersant, or a combination thereof.

Provided are methods for treating a subterranean formation in accordance with the description provided herein and as illustrated by FIGS. 1-2B. An example method comprises providing a liquid suspension of hollow particles comprising: a plurality of hollow particles, water, a suspending aid, and a stabilizer selected from the group consisting of a non-ionic surfactant, a latex, an oleaginous fluid, porous silica, and combinations thereof. The method further comprises statically storing the liquid suspension in a container for at least one week; wherein the liquid suspension maintains a difference in density from the top of the container to the bottom of the container of less than one pound per gallon while stored. The method further comprises adding the liquid suspension to a treatment fluid; wherein the liquid suspension reduces the density of the treatment fluid; and introducing the treatment fluid into a wellbore penetrating a subterranean formation. The liquid suspension may not be agitated prior to adding the liquid suspension to the treatment fluid. The liquid suspension may be statically stored for at least one month. The treatment fluid may comprise a water-based drilling fluid, a cement slurry, a completion fluid, a displacement fluid, or a conformance fluid. The plurality of hollow particles may be selected from the group consisting of glass spheres, glass microspheres, ceramic spheres, cenospheres, and combinations thereof. The plurality of hollow particles may comprise materials selected from the group consisting of glass, soda lime, borosilicates, fly ash, ceramic, and combinations thereof, The average particle size (D50) of the plurality of hollow particles may be in a range from about 5 μm to about 110 μm. The concentration of the plurality of hollow particles in the liquid suspension may range from about 25% to about 75% by volume of the liquid suspension. The suspending aid may be selected from the group consisting of diutan gums, scleroglucan, guar gums, carragenans, xanthan gums, welan, celluloses, hydroxyethyl celluloses, bentonite, attapulgite, sepiolite, vermiculite, illite, muscovite, biotite, kaolinite, cookeite, halloysite, flint clay, montmorillonite, hectorite, and combinations thereof. The stabilizer may comprise the non-ionic surfactant and the non-ionic surfactant may be selected from the group consisting of polyethylene oxide, polypropylene oxide, polyethyleneglycol alkyl ethers, polypropylene alkyl ethers, glucoside alkyl ethers, polyethyleneglycol alkylphenyl ethers, glycerol alkyl esters, sorbitan alkyl esters, polyethylene glycol/polypropylene glycol block copolymers, derivatives thereof, and mixtures thereof. The stabilizer may comprise the latex and the latex may comprise a rubber selected from the group consisting of cis-1,4-polyisoprene rubber, styrene-butadiene rubber, cis-1,4-polybutadiene rubber, high styrene resin, butyl rubber, ethylene-propylene rubbers, neoprene rubber, nitrile rubber, cis-/trans-1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber, polysulfide rubber, blends thereof, derivatives thereof, and combinations thereof. The stabilizer may comprise the oleaginous fluid and the oleaginous fluid may be selected from the group consisting of petroleum oils, natural oils, synthetically-derived oils, diesel oil, kerosene oil, mineral oil, synthetic oil, polyolefins, polydiorganosiloxanes, esters, diesters of carbonic acid, paraffins, and combinations thereof. The liquid suspension may further comprise a defoaming agent, a dispersant, or a combination thereof.

Provided are systems for treating a subterranean formation in accordance with the description provided herein and as illustrated by FIGS. 1-2B. An example system comprises a liquid suspension of hollow particles comprising: a plurality of hollow particles, water, a suspending aid, and a stabilizer selected from the group consisting of a non-ionic surfactant, a latex, an oleaginous fluid, porous silica, and combinations thereof wherein the liquid suspension is capable of being statically stored in a container for at least one week; wherein the liquid suspension maintains a difference in density from the top of the container to the bottom of the container of less than one pound per gallon while stored. The system further comprises a container capable of storing the liquid suspension of hollow particles for at least one week. The system further comprises a treatment fluid. The system further comprises mixing equipment capable of mixing the treatment fluid and the liquid suspension of hollow particles. The system further comprises pumping equipment capable of pumping the treatment fluid into a wellbore penetrating a subterranean formation. The treatment fluid may comprise a water-based drilling fluid, a cement slurry, a completion fluid, a displacement fluid, or a conformance fluid. The plurality of hollow particles may be selected from the group consisting of glass spheres, glass microspheres, ceramic spheres, cenospheres, and combinations thereof. The plurality of hollow particles may comprise materials selected from the group consisting of glass, soda lime, borosilicates, fly ash, ceramic, and combinations thereof, The average particle size (D50) of the plurality of hollow particles may be in a range from about 5 μm to about 110 μm. The concentration of the plurality of hollow particles in the liquid suspension may range from about 25% to about 75% by volume of the liquid suspension. The suspending aid may be selected from the group consisting of diutan gums, scleroglucan, guar gums, carragenans, xanthan gums, welan, celluloses, hydroxyethyl celluloses, bentonite, attapulgite, sepiolite, vermiculite, illite, muscovite, biotite, kaolinite, cookeite, halloysite, flint clay, montmorillonite, hectorite, and combinations thereof. The stabilizer may comprise the non-ionic surfactant and the non-ionic surfactant may be selected from the group consisting of polyethylene oxide, polypropylene oxide, polyethyleneglycol alkyl ethers, polypropylene alkyl ethers, glucoside alkyl ethers, polyethyleneglycol alkylphenyl ethers, glycerol alkyl esters, sorbitan alkyl esters, polyethylene glycol/polypropylene glycol block copolymers, derivatives thereof, and mixtures thereof. The stabilizer may comprise the latex and the latex may comprise a rubber selected from the group consisting of cis-1,4-polyisoprene rubber, styrene-butadiene rubber, cis-1,4-polybutadiene rubber, high styrene resin, butyl rubber, ethylene-propylene rubbers, neoprene rubber, nitrile rubber, cis-/trans-1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber, polysulfide rubber, blends thereof, derivatives thereof, and combinations thereof. The stabilizer may comprise the oleaginous fluid and the oleaginous fluid may be selected from the group consisting of petroleum oils, natural oils, synthetically-derived oils, diesel oil, kerosene oil, mineral oil, synthetic oil, polyolefins, polydiorganosiloxanes, esters, diesters of carbonic acid, paraffins, and combinations thereof. The liquid suspension may further comprise a defoaming agent, a dispersant, or a combination thereof.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of using a liquid suspension of hollow particles, the method comprising:
   providing a liquid suspension of hollow particles comprising:
      a plurality of hollow particles,
      water,
      a suspending aid,
      a styrene-butadiene latex stabilizer; and
      a non-ionic surfactant stabilizer selected from the group consisting of polyethylene oxide, polypropylene oxide, polyethylene glycol/polypropylene glycol block copolymers, derivatives thereof, and mixture thereof; wherein the non-ionic surfactant is present in the liquid suspension at a concentration of about 3% to about 30% by weight of the liquid suspension;
   statically storing the liquid suspension in a container for at least one week; wherein the liquid suspension maintains a difference in density from the top of the container to the bottom of the container of less than one pound per gallon while stored;
   adding the liquid suspension to a treatment fluid; wherein the liquid suspension reduces the density of the treatment fluid; and
   introducing the treatment fluid into a wellbore penetrating a subterranean formation.

2. The method of claim 1, wherein the liquid suspension is not agitated prior to adding the liquid suspension to the treatment fluid.

3. The method of claim 1, wherein the liquid suspension is statically stored for at least one month.

4. The method of claim 1, wherein the treatment fluid comprises a water-based drilling fluid, a cement slurry, a completion fluid, a displacement fluid, or a conformance fluid.

5. The method of claim 1, wherein the plurality of hollow particles are selected from the group consisting of glass spheres, glass microspheres, ceramic spheres, cenospheres, and combinations thereof.

6. The method of claim 1, wherein the suspending aid is selected from the group consisting of diutan gums, scleroglucan, guar gums, carragenans, xanthan gums, welan, celluloses, hydroxyethyl celluloses, bentonite, attapulgite, sepiolite, vermiculite, illite, muscovite, biotite, kaolinite, cookeite, halloysite, flint clay, montmorillonite, hectorite, and combinations thereof.

7. The method of claim 1, wherein the stabilizer comprises the latex and the latex comprises a rubber selected from the group consisting of cis-1,4-polyisoprene rubber, styrene-butadiene rubber, cis-1,4-polybutadiene rubber, high styrene resin, butyl rubber, ethylene-propylene rubbers, neoprene rubber, nitrile rubber, cis-/trans-1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber, polysulfide rubber, blends thereof, derivatives thereof, and combinations thereof.

8. A system for treating a subterranean formation comprising:
   a liquid suspension of hollow particles comprising:
      a plurality of hollow particles,
      water,
      a suspending aid,
      a styrene-butadiene latex stabilizer, and
      a non-ionic surfactant stabilizer selected from the group consisting of polyethylene oxide, polypropylene oxide, polyethylene glycol/polypropylene glycol block copolymers, derivatives thereof, and mixtures thereof; wherein the non-ionic surfactant is present in the liquid suspension at a concentration of about 3% to about 30% by weight of the liquid suspension; wherein the liquid suspension is capable of being statically stored in a container for one week; wherein the liquid suspension maintains a difference in density from the top of the container to the bottom of the container of less than one pound per gallon while stored;
   a container capable of storing the liquid suspension of hollow particles for at least one week;
   a treatment fluid;
   mixing equipment capable of mixing the treatment fluid and the liquid suspension of hollow particles;
   pumping equipment capable of pumping the treatment fluid into a wellbore penetrating a subterranean formation.

9. The system of claim 8, wherein the suspending aid is selected from the group consisting of diutan gums, scleroglucan, guar gums, carragenans, xanthan gums, welan, celluloses, hydroxyethyl celluloses, bentonite, attapulgite, sepiolite, vermiculite, illite, muscovite, biotite, kaolinite, cookeite, halloysite, flint clay, montmorillonite, hectorite, and combinations thereof.

10. The system of claim 8, wherein the stabilizer comprises the latex and the latex comprises a rubber selected from the group consisting of cis-1,4-polyisoprene rubber, styrene-butadiene rubber, cis-1,4-polybutadiene rubber, high styrene resin, butyl rubber, ethylene-propylene rubbers, neoprene rubber, nitrile rubber, cis-/trans-1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber, polysulfide rubber, blends thereof, derivatives thereof, and combinations thereof.

* * * * *

UNITED STATES PATENT AND TRADEMARK OFFICE
CERTIFICATE OF CORRECTION

PATENT NO. : 11,466,202 B2
APPLICATION NO. : 16/336825
DATED : October 11, 2022
INVENTOR(S) : Xueyu Pang et al.

Page 1 of 1

It is certified that error appears in the above-identified patent and that said Letters Patent is hereby corrected as shown below:

In the Claims

Column 18, Line 8, after "stabilizer," insert --additionally--.
Column 18, Line 9, delete "the latex and the latex comprises.".
Column 18, Line 11, delete "styrene-butadiene rubber,".
Column 18, Line 55, after "stabilizer," insert --additionally--.
Column 18, Line 56, delete "the latex and the latex comprises.".
Column 18, Line 58, delete "styrene-butadiene rubber,".

Signed and Sealed this
Seventh Day of November, 2023

Katherine Kelly Vidal
*Director of the United States Patent and Trademark Office*